Patented Apr. 21, 1953

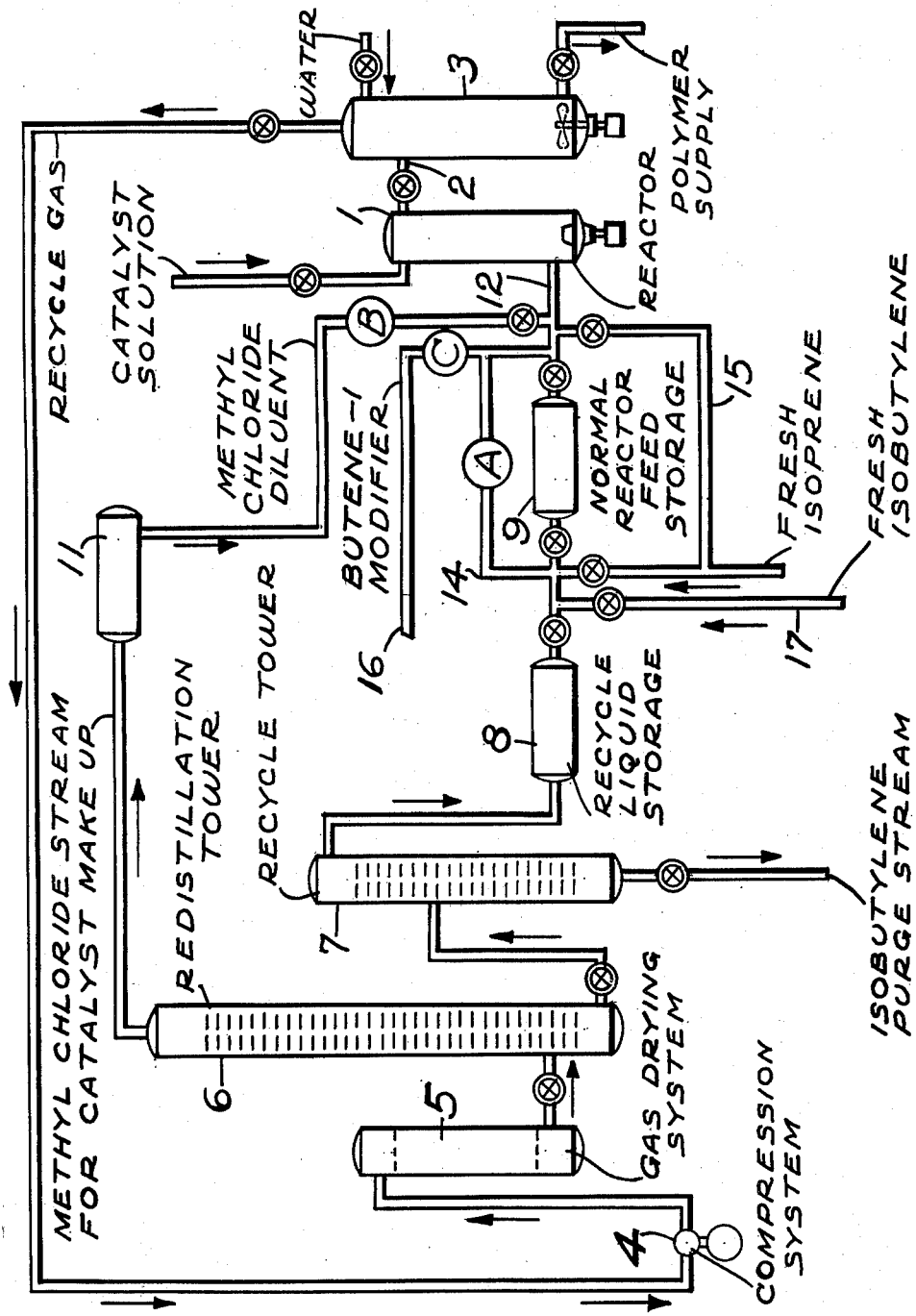

2,636,025

UNITED STATES PATENT OFFICE 2,636,025

METHOD FOR STARTING LOW-TEMPERATURE ISOOLEFIN POLYMERIZATION AFTER SOLVENT-CLEANING THE REACTOR

Ralph F. Howe and Frederic A. L. Holloway, Baton Rouge, La., assignors to Standard Oil Development Company, a corporation of Delaware Application October 11, 1949, Serial No. 120,804

5 Claims. (Cl. 260—85.3)

This invention relates to low temperature polymerization processes for olefinic materials, relates particularly to continuous low temperature polymerization processes for the copolymerization of olefins, and relates especially to methods, apparatus and procedures for initiating the reaction in a reactor newly put on stream, to avoid the production of poor polymerization initially, and produce specification grade of polymer from the beginning of the operating cycle.

The basic procedure involved in this invention is well shown in U. S. Patents No. 2,356,127 and 2,356,128, which are herewith made a part of this application, which show the details of the method for the copolymerization of isobutylene with a multiolefin such as butadiene or isoprene or other multiolefin having from 4 to 14, inclusive, carbon atoms per molecule, the reaction being conducted at temperatures within the range between about —40° C. to about —103° C., this being the preferred range, or broadly within the range between about —6° C. and —164° C., the polymerization reaction being catalyzed by the application to the cold olefinic material of a dissolved or liquid Friedel-Crafts active metal halide catalyst.

These copolymers, particularly the copolymer of isobutylene with isoprene, have proven commercially satisfactory for the manufacture of automobile inner tubes, and several commercial plants have been built utilizing groups of continuous reactors which are approximately 5 ft. in internal diameter by 27 ft. high, holding about 14,000 pounds of polymerizate mixture. These reactors are jacketed with a liquid ethylene as a refrigerant, producing a temperature in the material within the reactor which varies between —87° C., and —100° C., depending upon the condition of the reactor. These reactors are assembled in groups, each reactor having a "flash tank" partly filled with warm water, into which a slurry of solid polymer in diluent and unpolymerized reactants is delivered from the reactor to flash off the volatiles and produce a water slurry of the solid polymer; from which the solid polymer is easily removed for drying and further processing. Each reactor is equipped with a powerful circulating stirrer and each group is equipped with compressors and coolers for producing liquid ethylene, and with a series of fractionating towers, dryers and the like, for recovery of the flashed off volatiles for recycling. Each reactor, likewise, is provided with means for delivering thereto a supply of cold olefinic mixture and a supply of cold solution of a Friedel-Crafts active metal halide catalyst; as is well shown in application, Serial No. 545,099, filed July 15, 1944, by Joseph F. Nelson (now Patent No. 2,577,856, issued December 11, 1951.

However, the reaction produces not only a slurry of solid polymer in diluent and reactants, but it produces also a small amount of polymer which adheres very tightly to the interior of the reactor and to the stirrer. As this layer of adherent polymer (called by the operators "fouling") builds up, it interposes a thermal resistance to the transfer of heat from the reactant mixture through the reactor walls to the refrigerant; and on the stirrer it changes the contours of the stirrer in such a way as to reduce, markedly, the rate of circulation. Accordingly, after from fifteen hours or less, to fifty or seventy-five hours or even longer of operation, the reactor must be cleaned of this fouling layer. The cleaning is preferably conducted by the use of a solvent of some sort such as warm naphtha or warm isobutylene under pressure or the like. In some instances the reactor must be cleaned by hand, but this is laborious, time-consuming and expensive, and therefore highly undesirable.

In any event, however, the cleaning of the reactor necessarily removes therefrom the equilibrium mixture from which there was being produced a good grade of polymer, necessarily interrupts the polymerization reaction for a more or less lengthy period of time; and in addition, necessitates a restarting of the reactor when it has been cleaned.

During the operation of the reactor, an equilibrium condition is established in the reactor contents to bring into operation therein the effects of the presence of approximately 12% to 20% of solid, slurried, copolymer, and also an amount of both isobutylene and multiolefin less than that normally present in the mixed feed stream, and a percentage of diluent normally substantially greater than the percentage present in the feed stream. Also, it is not possible to produce absolutely pure isobutylene or absolutely pure isoprene, and accordingly, the impurities present in the feed stream build up in the equilibrium mixture to substantially higher values. However, the analysis of this reaction mixture is extremely difficult and it is commercially impossible to duplicate it is a fresh mixture.

The polymerized material discharged from the flash tank contains a major portion, but not all of the impurities from the isobutylene and isoprene, since small portions of such impurities as butene-1 and butene-2 tend to copolymerize, which copolymerization sharply interferes with the over-all reaction. Accordingly, for equilibrium conditions, it is found necessary, in order to produce satisfactory polymer, to adjust the purity of the feed stream and the amount of catalyst in such a way as to limit interference of these impurities, maintaining the amount of impurity in the equilibrium mixture at a value sufficiently low to permit of the manufacture of satisfactory polymer.

When, however, a newly cleaned reactor is filled with the normal feed, very great difficulty is encountered in the production of satisfactory polymer, and even greater difficulty is encountered in the avoidance of reactor runaways.

This situation occurs in part because of the fact that none of the multiolefins will copolymerize with isobutylene in the proportion in which they are present in the polymerizate mixture. Thus, a mixture containing 30% butadiene with 70% isobutylene produces a copolymer in which the amount of copolymerized butadiene is only about 3%. With isoprene, there must be present about 4⅓% of isoprene to produce a copolymer containing 2½% of copolymerized isoprene. Likewise, with dimethyl butadiene, somewhat less diolefin copolymerizes than is present in the original picture. This situation is further complicated by the fact that when the two materials copolymerize in a different ratio from that in which they are present, the proportion between the two changes as the polymerization continues, with the result that polymer made at the beginning of the reaction is markedly different from the polymer produced when the reaction is just about complete, and accordingly, the percentage yield is important as a factor in the control, both of the polymer produced and in the control of the equilibrium mixture.

The other multiolefins such as myrcene, 2-methyl, 3-nonyl, butadiene, 1-3 and the like, including all of the several series of substituted butadienes and the several analogous non-conjugated multiolefins lie, in their properties, between these extremes. Furthermore, complete polymerization of all of the unsaturates present in the discharge stream cannot be obtained while maintaining a satisfactory polymer quality. Accordingly, in continuous operation, the input stream of feed material necessarily must match the discharge stream in material content and proportion, and the discharge stream consists in part of copolymerized olefins, in part of unpolymerized olefins, in part of diluent and in part of extraneous materials. Also, the overflow into the discharge stream consists of two separate portions, a substantial portion being a solid polymer having one ratio of components and a liquid portion having a wholly different ratio of components. Accordingly, the liquid portion of the overflow which is the material being polymerized and the material in which the equilibrium composition is established does not correspond to the composition of the liquid unpolymerized material being fed to the reactor.

Furthermore, it is commercially unfeasible to effect a complete separation of isobutylene from butene-1 and accordingly, the isobutylene stream delivered to the reactor contains significant amounts of buetene-1. This is always less than 1%, and efforts are made, not always too successfully, to keep it below two-tenths of 1%. Also, butene-1 is a strong catalyst poison, markedly influencing the course of the reaction and markedly reducing the molecular weight of the polymer produced; yet the butene-1 is only slightly, if at all, copolymerized. Accordingly, the reactor contents will of necessity build up a relatively high ratio of butene-1 to isobutylene, which must be allowed for in the reaction.

The relationship between the liquid contents of the reactor and the normal reactor feed is approximately as shown in the following Table I:

*Table I*

| Composition of Liquid | Normal Reactor Feed | Normal Equilibrium Reactor Liquid |
|---|---|---|
| Isobutylene, Wt. Percent | 28.0 | 7.0 |
| Isoprene, Wt. Percent | 0.65 | 0.3 |
| Butene-1, Wt. Percent | 0.35 | 0.4 |
| Methyl chloride, Wt. Percent | 71.0 | 92.3 |
| | 100.00 | 100.0 |

It has been suggested that the amount of unsaturated materials could be reduced in the startup mixture. This, however, is unsatisfactory because no proportions can be found which will match the polymer produced at the beginning to the steady state polymer, because of the absence of equilibrium amounts of butene-1, and the absence of equilibrium amounts of multiolefin.

According to the present invention, it is now found that if the reactor is filled from a feed stream made up of the normal diluent, in part of isobutylene of the normal purity, with a part of the necessary isobutylene obtained from recycle material containing a higher proportion of impurities such as butene-1 and butene-2, in part with additional fresh isoprene of normal purity and in part from recycle isoprene in about normal feed stream amount, rather than the equilibrium percentage, with a slightly increased amount of butene-1, a mixture is obtained which, while not even approximately near to the equilibrium mixture, yet is so balanced in its components as to produce polymer of specification grade from the initial production of polymer on to the end of the run. As so prepared, the starting mixture contains a small excess of diluent over the normal equilibrium mixture, about the normal to a slightly larger proportion of isoprene and a slightly increased amount of butene-1, although the butene-1 is preferably less than 1%.

The normal catalyst is used and when the reactor is cooled, filled to overflowing and the catalyst stream started, a period occurs during which the initial stages of copolymerization occur without any tendency towards reactor runaways, which are almost unavoidable when a reactor is filled with the normal feed stock, and in addition, the first polymer produced has the normal molecular weight, and no abnormally high molecular weight polymer is produced, as is unavoidable when the reactor is filled with the normal feed stream. The unexpected and rather surprising fact thus appears that the presence of a slightly increased amount of butene-1 and a small amount of excess diluent appear to compensate for the absence of all of the components of the equilibrium composition of the reaction mixture.

The supply of modified mixture from recycle material, normal fresh feed and excess isoprene may be continued until polymerization begins, at which point the feed supply may be transferred wholly to normal feed stock. By this procedure no defective polymer is produced and a minimum of danger of reactor runaways occurs, and a polymer having a molecular weight of about 60,000 and an iodine number (by the Wijs method) of approximately 2.2 or any other combination of desired molecular weight and iodine number is obtained from the beginning of the reactor operation.

(It is observed that polymerization does not begin with the first drop of catalyst solution, but sufficient catalyst must be added to bring the concentration above a threshold minimum. The reason for this is not fully known, but it may be that certain impurities in the mixture which combine with the catalyst must be satisfied, and it appears that there must be more than some minimum concentration of catalyst to initiate the polymerization reaction. However, these requirements vary from minute to minute and it has not been found possible to determine how much catalyst solution is required to provide a sufficiently high concentration to start the reaction. Accordingly, the only possible procedure is to deliver the normal catalyst stream, and wait until the reaction begins. However, with very pure reactants and a relatively small amount of diluent, the threshold value may be reached and passed with a substantial excess before the reaction starts, whereupon there is enough catalyst in the mixture to polymerize the whole olefinic content, which occurs within a very small fraction of a second as a reactor runaway, resulting in the liberation of heat at a much faster rate than it can be removed to and by the cooling jacket, and in consequence, a very dense slurry is produced at a temperature much higher than normal, sometimes above the boiling point of the diluent, and in consequence, the polymer is of such low grade as to be unusable. Also, such a runaway definitely terminates a run, and the reactor must be cleared of the defective polymer, and the run started over again.)

Thus the invention permits of the starting up of the low temperature continuous polymerization reactor with a fresh filling of reactants, free from solid polymer slurry, without reactor runaways and without the production of abnormal polymer, by a procedure of a simple but unexpected adjustment of reactor feed and reactor filling, the supply of reactants being shifted to the normal reactor feed when polymerization starts, or relatively soon thereafter.

Thus the procedure of the present invention starts a continuous copolymerization reaction in a clean reactor by a simple adjustment of reaction mixture and impurities, whereby reactor runaways and the production of defective polymer are avoided. Other objects and details of the invention will be apparent from the following description when read in connection with the accompanying drawing; wherein The single figure is a flow diagram of the process according to the present invention.

Referring to the single figure, there are provided reactor members 1, each discharging through an overflow 2 into a flash tank 3. The flash tank 3 is filled approximately one-sixth to one quarter full of warm water and a continuing stream of warm water is delivered to the flash tank. The overflow from the reactors is then discharged into the flash tank 3.

Under normal operating conditions, at least one, and usually more of the reactors are "on stream" and in normal equilibrium condition, delivering to the water in the flash tank 3 normal streams of slurries of solid polymer in diluent with small percentages of unreacted olefins. The diluent and unreacted olefins are volatilized, the slurry is converted to a slurry of solid polymer in water which is drained from the bottom of the tank and conveyed to filters, driers, and the like, for sheeting out, packaging and shipping. The flash gas from the flash tank 3 is conveyed to the purifying system, where it is first compressed in a compressor 4, then dried in a dried 5, then passed through a first fractionating tower 6, from which an overhead stream of diluent is removed. The bottoms from tower 6 pass to tower 7 from which an overhead stream containing any remaining diluent and the desired amount of recycle isobutylene may be removed. The bottoms from the tower 7 are withdrawn as a purge stream to reduce the amount of butene-1 present in the circulating system as well as to remove unreacted multiolefin and any undesirable heavier materials. The bottoms are preferably delivered to a debutanizer and sent through the normal isobutylene separating system. The overhead from tower 7 is condensed and delivered to a storage drum 8.

For those reactors which are operating normally and contain an equilibrium mixture, a portion of recycle material from fractionating tower 7, comprising diluent and recycle isobutylene from the drum 8 is conveyed to a drum 9 and is there mixed with a supply of fresh isobutylene from the isobutylene purifiers, and with an appropriate amount of fresh isoprene and delivered under valve control through a cooler (not shown) to the normally operating reactors.

Simultaneously, a solution of catalyst is prepared, preferably aluminum chloride in solution in methyl chloride (although any Friedel-Crafts active metal halide substance in solution in any low freezing non-complex forming solvent may be used).

(For the Friedel-Crafts catalyst, any of the active metal halide substances shown by N. O. Calloway in his article on the "Friedel-Crafts Synthesis," printed in the issue of "Chemical Reviews," published from the American Chemical Society at Baltimore in 1935 in volume XVII, No. 3, the article beginning on page 327; the list being particularly well shown on page 375 may be used.)

For the catalyst solvent, any low freezing non-complex forming solvent may be used. To be low-freezing, it is merely necessary that the solvent have a freezing point below 0° C. (It is convenient, but not necessary that the freezing point of the solvent be below the polymerization temperature, it being found that even though the freezing point is above the polymerization temperature, the catalyst solvent and the dissolved catalyst both dissolve in the reaction mixture before they solidify, or dissolve from the solid form.) To be non-complex forming, it is only necessary that the catalyst solution show only the normal small reduction in freezing point and elevation in boiling point characteristic of simple solutes, and that in general, the dissolved active metal halide can be recovered unchanged merely by evaporation of the solvent at approximately the normal boiling point of the solvent.

When a reactor has become fouled by the adhesion of a layer of polymer on the inner surface, the supply of feed and catalyst solution are discontinued, the reactor emptied by any convenient method, such as that shown in Serial No. 50,848, filed September 23, 1948, for Benoliel and Flanagan, now Patent No. 2,530,145, issued November 14, 1950, or by other methods as desired, and the interior of the reactor cleaned of the adhering polymer. When the reactor has been fully cleaned and is ready for re-use, it is cooled to operating temperature by the delivery of liquid refrigerant to the refrigerating jacket, and the simultaneous delivery to the reactor of the cold special starting mixture. For this purpose a supply of methyl chloride is taken from the storage container 11 and delivered to the feed line 12 leading to the offstream reactor 1. Simultaneously, a substantial portion to nearly all of the required isobutylene is taken from the storage drum 8 via a separate feed line 14 to the supply line 12. (The line 12 is preferably equipped with a cooling coil surrounded by liquid refrigerant, through which the material passes.) Simultaneously, a small additional amount of fresh or recycle isoprene is delivered through a supply line 15 to the feed line 12, and a very small amount of butene-1 is delivered through a line 16 to the feed line 12, the butene-1 being obtained from the isobutylene purification plant, there being ample supplies available from the isobutylene purification plant. Furthermore, it is not necessary that pure butene-1 be used, merely that there be sufficient butene-1 added to obtain the desired result. Under some conditions it may be desirable to supply fresh isobutylene to the extent of part or all of the reactor charge through lines 17 and 14, replacing in part the material taken from storage drum 8 and at the same time to increase the amount of butene-1 modifier added through line 16 to compensate for the higher purity of the fresh isobutylene.

It may be noted that butane is harmless in the reaction, and that butene-2 is much less effective for the purpose than butene-1, and accordingly, the presence of small quantities of butene-2 and butane may be neglected.

The stream of modified cold feed is continued until the reactor is full and a small stream starts to overflow. A check on the temperature usually is desirable at this point, and if the temperature is within the appropriate range between about —90° C. and —103° C., the stream of catalyst may be started. In preparing the catalyst it is usually convenient to take an auxiliary stream of methyl chloride from the storage container 11 and pass it through a container having therein a substantial quantity of solid anhydrous aluminum chloride, the stream being allowed to pass through at a leisurely rate. The result is a nearly saturated solution of aluminum chloride in methyl chloride, which may contain from 1% to about 3½% of aluminum chloride. It is usually desirable to dilute this relatively concentrated stream of dissolved catalyst with enough additional methyl chloride from the container 11 to bring the concentration down to a value within the range between about 0.2% and 1%, since higher concentrations are found to be unduly reactive, even though they are mixed into large quantities of the original feed.

It may be noted that when the reactor is full and the stream of catalyst started, it may require from ten minutes to an hour to bring the catalyst concentration up to the point where there is sufficient catalyst present to start the reaction. When the necessary amount of catalyst has been added, which may be within the range between 1 pound per thousand pounds of isobutylene, and 10 pounds per thousand pounds of isobutylene, the polymerization reaction starts.

It may be noted that with the mixtures prepared as above described, the reaction starts slowly, smoothly and easily, with no tendency of undue speed of polymerization, which would produce a reactor runaway, and with no tendency to produce unduly high molecular weight polymer, and with no tendency to produce a polymer with greater or less than the desired amount of unsaturation as determined by the iodine number.

The above procedure has been found to be highly satisfactory and effective in the production of the desirable polymer from the beginning to end of an operating cycle.

Alternatively, various modifications may be introduced. That is, the reaction mixture may be prepared only from recycle material from storage drum 8 without the addition of fresh isobutylene from the purification plant. When this system is used, a slightly somewhat greater supply of fresh isoprene is required and usually a somewhat smaller amount of butene-1 from the purification plant. As before, this procedure permits of the adjustment of the reaction mixture to contain the desired small excess of butene-1 and the desired excess of recycle methyl chloride.

It should be further noted that while the above procedure suggests the use of recycle methyl chloride exclusively, this is not essential, since fresh methyl chloride may be used interchangeably. It does not appear that the quality of methyl chloride from the first fractionation tower is significantly different from that of fresh methyl chloride.

Also, as another alternative, the bottoms from the second fractionation tower 7 may also be used in place of the butene-1 supplied from the purification plant. This, however, is less satisfactory since the amount of butene-1 and other impurities in these bottoms is not always accurately known, and much greater difficulty is encountered in making up a satisfactory starting mixture. Alternatively, also, bottoms from the first tower 6 containing isobutylene, isoprene, butene-1, and any remaining diluent may be used directly, being strengthened somewhat with small quantities of additional fresh isoprene. This procedure also is less desirable than that first described, because of the uncertainty of the butene-1 content. Also, both of these last embodiments are less desirable because of a tendency to include still other impurities of unknown effect.

It is of the essence of the invention that the reactor shall be filled with the modified mixture as described and the catalyst addition begun into this modified mixture. Within the scope of the invention it is then possible to shift to normal reactor feed as soon as the catalyst stream is started, or when the polymerization reaction begins, or when the reaction has reached its normal rate, as indicated by the evolution of refrigerant gas from the refrigerating jacket.

The preferred method, however, is to reduce the modified stream when the catalyst stream starts, and begin the normal feed stream at about the same time, making a gradual shift from one stream to another during the time between the beginning of the catalyst stream and the arrival of normal polymerization rate. As a guide to the preparation of the modified feed stream, the following table shows the proportions of components in the various parts of the system:

composition of reactants is maintained such that the ratio of isobutylene to butene-1 is sub-

*Table II*

| Comp. of Liquid | Recycle | Fresh Isobutylene | Modified Feed | Normal Reactor Feed | Normal Reactor Liquid |
|---|---|---|---|---|---|
| Isobutylene, percent | 4 | 99.5 | 5.0 | 28 | 7.0 |
| Isoprene | 0 | 0 | 0.25 | 0.65 | 0.3 |
| Butene-1 | 0.3 | 0.5 | 0.6 | 0.35 | 0.4 |
| Methyl Chloride | 95.7 | 0 | 94.1 | 71.0 | 92.3 |
| Ratio $\frac{\text{isobutylene}}{\text{butene-1}}$ | 13.3 | | 8.3 | 80 | 17.5 |

Thus the process of the present invention modifies the initial reactant feed to a polymerization reactor by increasing the amount of diluent, increasing the amount of butene-1, decreasing the amount of isobutylene and isoprene to compensate for the change in conditions between a newly cleaned reactor and a somewhat fouled reactor to prevent the production of unsatisfactory polymer, and to reduce the danger of reactor runaways.

The modified feed used for filling the reactor contains approximately one-fifth the normal percentage of isobutylene, approximately two-fifths the normal amount of diolefin, about twice the amount of butene-1, and an increased amount of diluent. Operating in this manner, the concentration of olefin reactants is less than one-half the concentration of olefinic reactants in the normal reactor feed.

As can be seen from Table II above, the modified feed as well as the recycle stream both contain substantially less isobutylene in comparison to butene-1 content than does the normal reactor liquid which has 17.5 parts of isobutylene per part of butene-1, as shown in Table II.

While there are above disclosed but a limited number of embodiments of the process and apparatus of the present invention, it is possible to provide still other embodiments without departing from the inventive concept herein disclosed, and it is therefore desired that only such limitations be imposed upon the appended claims as are stated therein or required by the prior art.

The invention claimed is:

1. In a continuous low temperature polymerization process for the copolymerization of isobutylene and a multiolefin having from 4 to 14, inclusive, carbon atoms per molecule in the presence of a catalyst solution consisting of a Friedel-Crafts catalyst dissolved in a low-freezing, non-complex-forming solvent, the steps in combination of solvent-cleaning the reactor, cooling the reactor to a temperature within the range between $-87°$ C., and $-103°$ C., simultaneously delivering thereto a filling of reactive material containing approximately one-fifth the normal percentage of isobutylene; approximately two-fifths the normal amount of diolefin; about twice the amount of butene-1, and an increased amount of diluent, whereby the concentration of olefin reactants is less than one-half the concentration of olefin reactants in the normal reactor feed, delivering to the filled reactor at the desired low temperature a stream of liquid catalyst solution, sufficient to initiate polymerization, starting polymerization, continuing the catalyst stream after start of polymerization, and gradually shifting the composition of reactor feed to a normal value, during which shift, the stantially less than 17.5, markedly different from the equilibrium value of reaction mixture in the polymerizer, relying upon the modified initial composition to produce polymer of the same quality as is later obtained from an equilibrium filling and to prevent reactor runaways.

2. In a continuous low temperature polymerization process for the copolymerization of isobutylene and isoprene in the presence of a catalyst solution consisting of aluminum chloride in solution in a low-freezing, non-complex-forming solvent, the steps in combination of solvent-cleaning the reactor, cooling the reactor to a temperature within the range between $-87°$ C., and $-103°$ C., simultaneously delivering thereto a filling of reactive material containing approximately one-fifth the normal percentage of isobutylene; approximately two-fifths the normal amount of diolefin; about twice the amount of butene-1, and an increased amount of diluent, whereby the concentration of olefin reactants is less than one-half the concentration of olefin reactants in the normal reactor feed, delivering to the filled reactor at the desired low temperature a stream of liquid catalyst solution, sufficient to initiate polymerization, starting polymerization, continuing the catalyst stream after start of polymerization, and gradually shifting the composition of reactor feed to a normal value, markedly different from the equilibrium value of reaction mixture in the polymerizer, relying upon the modified initial composition to produce polymer of the same quality as is later obtained from an equilibrium filling and to prevent reactor runaways.

3. In a continuous low temperature polymerization process for the copolymerization of isobutylene and isoprene in the presence of a catalyst solution consisting of aluminum chloride in solution in a low-freezing, non-complex-forming solvent, the steps in combination of solvent-cleaning the reactor, cooling the reactor to a temperature within the range between $-87°$ C., and $-103°$ C., simultaneously delivering thereto a filling of reactive material containing approximately one-fifth the normal percentage of isobutylene; approximately two-fifths the normal amount of diolefin; about twice the amount of butene-1, and an increased amount of methyl chloride, whereby the concentration of olefin reactants is less than one-half the concentration of olefin reactants in the normal reactor feed, delivering to the filled reactor at the desired low temperature a stream of liquid catalyst solution, sufficient to initiate polymerization, starting polymerization, continuing the catalyst stream after start of polymerization, and gradually shifting the composition of reactor feed to a normal value, markedly different from the equilibrium value of reaction mixture in the polymerizer, relying upon the modified initial composition to produce polymer of the same quality as is later obtained from an equilibrium filling and to prevent reactor runaways.

4. In a continuous low temperature polymerization process for the copolymerization of isobutylene and butadiene in the presence of a catalyst solution consisting of aluminum chloride in solution in a low-freezing, non-complex-forming solvent, the steps in combination of solvent-cleaning the reactor, cooling the reactor to a temperature within the range between −87° C., and −103° C., simultaneously delivering thereto a filling of reactive material containing approximately one-fifth the normal percentage of isobutylene; approximately two-fifths the normal amount of diolefin; about twice the amount of butene-1, and an increased amount of methyl chloride, whereby the concentration of olefin reactants is less than one-half the concentration of olefin reactants in the normal reactor feed, delivering to the filled reactor at the desired low temperature a stream of liquid catalyst solution, sufficient to initiate polymerization, starting polymerization, continuing the catalyst stream after start of polymerization, and gradually shifting the composition of reactor feed to a normal value, markedly different from the equilibrium value of reaction mixture in the polymerizer, relying upon the modified initial composition to produce polymer of the same quality as is later obtained from an equilibrium filling and to prevent reactor runaways.

5. In a continuous low temperature polymerization process for the copolymerization of isobutylene and dimethyl butadiene in the presence of a catalyst solution consisting of aluminum chloride in solution in a low-freezing, non-complex-forming solvent, the steps in combination of solvent-cleaning the reactor, cooling the reactor to a temperature within the range between −87° C., and −103° C., simultaneously delivering thereto a filling of reactive material containing approximately one-fifth the normal percentage of isobutylene; approximately two-fifths the normal amount of diolefin; about twice the amount of butene-1, and an increased amount of methyl chloride, whereby the concentration of olefin reactants is less than one-half the concentration of olefin reactants in the normal reactor feed, delivering to the filled reactor at the desired low temperature a stream of liquid catalyst solution, sufficient to initiate polymerization, starting polymerization, continuing the catalyst stream after start of polymerization, and gradually shifting the composition of reactor feed to a normal value, markedly different from the equilibrium value of reaction mixture in the polymerizer, relying upon the modified initial composition to produce polymer of the same quality as is later obtained from an equilibrium filling and to prevent reactor runaways.

RALPH F. HOWE.
FREDERIC A. L. HOLLOWAY.

References Cited in the file of this patent

UNITED STATES PATENTS

| Number | Name | Date |
|---|---|---|
| 2,444,848 | Purvin | July 6, 1948 |
| 2,580,490 | Walsh | Jan. 1, 1952 |